United States Patent Office 2,770,582
Patented Nov. 13, 1956

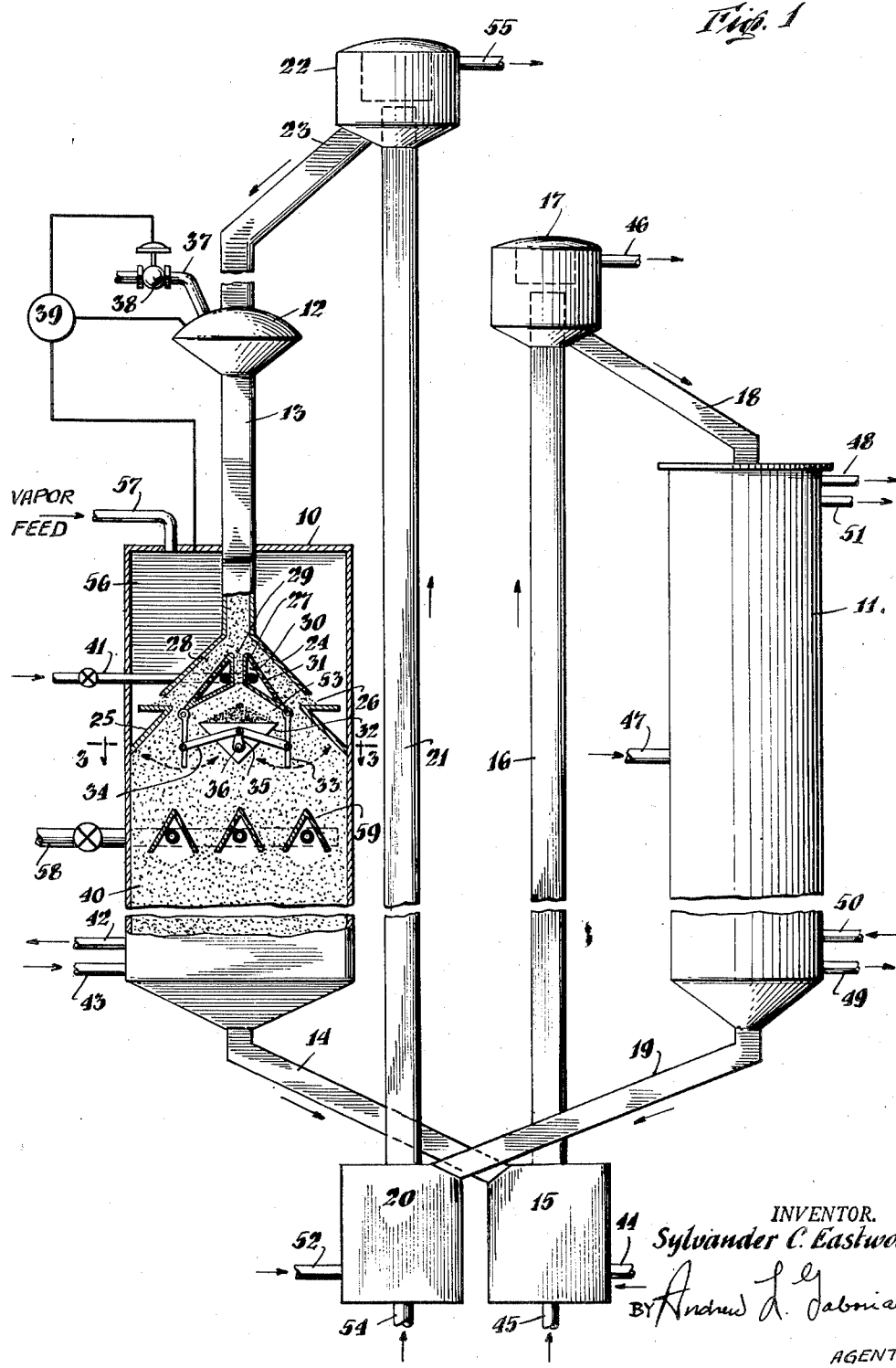

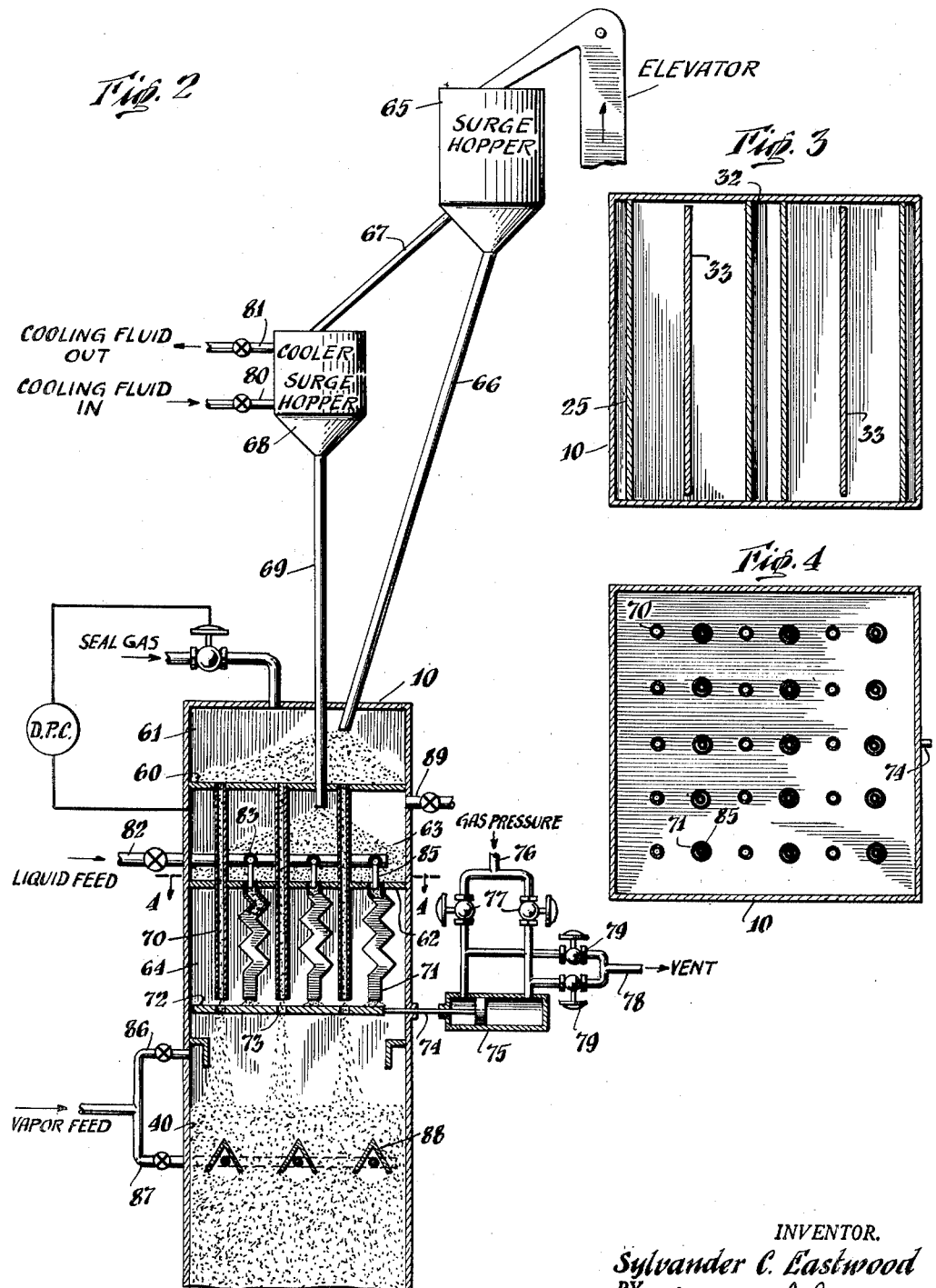

2,770,582

METHOD AND APPARATUS FOR THE CONVERSION OF HIGH BOILING LIQUID HYDROCARBONS

Sylvander C. Eastwood, Woodbury, N. J., assignor to Socony Mobil Oil Company, Inc., a corporation of New York Application October 7, 1952, Serial No. 313,546

9 Claims. (Cl. 196—52)

This invention pertains to a method and apparatus for the conversion of high boiling liquid or mixed phase hydrocarbons to lower boiling hydrocarbons in the presence of a moving mass of granular contact material which may or may not exhibit catalytic properties with respect to the conversion reaction. Particularly, this invention applies to conversion processes wherein the contact material is passed cyclically through a conversion zone wherein it flows as a substantially compact columnar mass while being contacted with hydrocarbon charge to effect its conversion, and through a regeneration or reconditioning zone wherein the contact material is conditioned for reuse in the conversion zone.

Typical of such processes is the catalytic conversion of heated liquid hydrocarbons to lower boiling, gasoline containing, gaseous hydrocarbon products by contacting a high boiling liquid charge, at temperatures of 850° F. and upwards, with a granular, adsorbent, catalytic material. Other exemplary processes are the thermal visbreaking, coking or cracking of liquid or mixed phase hydrocarbon charge by contact with heated granular inert contact materials. In processes wherein the contact material is catalytic in nature it may partake of the nature of natural or synthetic clays, bauxite, activated alumina or silica and alumina to which other substances, such as certain metallic oxides, may be added in small amounts for specific purposes. When the contact material is inert in character it may partake of the form of refractory materials such as zirkite or corhart material or mullite, or it may partake of the form of stones or metallic particles or balls or particles of coke. It is desirable to maintain the size of the contact material particles within the range about 3 to 100 mesh and preferably within the range about 4 to 20 mesh, by Tyler standard screen analysis.

In charging liquid hydrocarbons to the conversion zone of processes of the aforementioned types, it is of prime importance that the liquid hydrocarbons be introduced in such a manner that there is uniform distribution of the liquid across the horizontal cross-section of the columnar mass of contact material within the conversion zone. Uneven distribution of the charge results in over-conversion of a portion of the hydrocarbon charge, and under-conversion of the remaining portion so that a low quality product results. A further problem occurring in systems employing liquid hydrocarbon charge is the accumulation of coke deposits on metal surfaces of the conversion chamber. These coke deposits are due to the liquid charge contacting the hot metal surfaces and undergoing a rapid conversion which deposits the coke. Coke deposits may build up on the metal surfaces and break off as large pieces which pass downwardly with the contact material and plug up restricted passages in the lower section of the conversion vessel or elsewhere in the system.

An object of this invention is to provide a method and apparatus for the conversion of high boiling liquid or mixed phase hydrocarbon charge to lower boiling products in the presence of a moving columnar mass of granular contact material which overcomes the above-described difficulties.

Another object of this invention is to provide a method and apparatus for the introduction of liquid hydrocarbon charge uniformly to a conversion zone without the accumulation of coke deposits on the hot metal surfaces in the conversion zone.

These and other objects of the invention will be apparent from the following discussion.

Before proceeding with the discussion, certain terms used in describing and claiming this invention will be defined. The term "gaseous" as used herein is intended to refer to a material existing in the gaseous phase under the particular conditions of temperature and pressure involved, regardless of what may be the normal phase of that material under ordinary atmospheric conditions. Similarly, "liquid" refers to material in the liquid phase under the particular conditions prevailing, regardless of its normal state.

In the process of this invention, a columnar mass of contact material is maintained within a confined conversion zone. Contact material is removed from the lower section of the columnar mass to promote downward movement of the contact material granules through the column and fresh contact material is supplied to the columnar mass. A portion of the fresh contact material to be supplied is first mixed with the liquid hydrocarbon charge. Contact material is then supplied to at least one contact material surface below which lies a columnar mass of contact material as alternate layers of contact material mixed with liquid charge and fresh contact material free of liquid charge. The liquid charge then is passed through the columnar mass to effect the desired conversion.

The invention will be best understood by referring to the attached drawings of which, Figure 1 is an elevational view, partially in section, showing the application of one form of this invention to a hydrocarbon conversion system, Figure 2 illustrates the application of a second form of this invention to the upper section of a hydrocarbon conversion zone, Figure 3 is a sectional view along line 3—3 of Figure 1, and Figure 4 is a sectional view along line 4—4 of Figure 2.

All of these drawings are diagrammatic in form and like parts in all bear like numerals.

Referring to Figures 1 and 3, which will be considered together, there is shown therein an enclosed conversion vessel 10 and a reconditioning vessel 11 positioned side by side. A seal chamber 12 is positioned above chamber 10 and a conduit 13 extends from the bottom of the seal chamber into the upper section of vessel 10. A contact material withdrawal conduit 14 extends from the lower section of chamber 10 into a lift feed tank 15. A lift pipe 16 extends vertically upwardly to a combined separator and supply hopper 17. Conduit 18 connects the lower section of hopper 17 with the upper section of regeneration vessel 11. Drain conduit 19 extends from the lower end of vessel 11 onto a second lift feed tank 20. Lift pipe 21 extends vertically upwardly into separator-supply hopper 22. Conduit 23 connects hopper 22 with seal zone 12. The lower end of conduit 13 is flared in one direction across vessel 10 so as to extend substantially completely across one horizontal dimension of 10. This flaring is not visible in Figure 1 because the direction of flaring is perpendicular to the figure. Attached to the lower end of conduit 13 are two confining plates or members 24 which extend outwardly and downwardly toward opposite walls of vessel 10. To further inclined plates or members 25 extend upwardly from opposite walls of vessel 10 and terminate a spaced distance away from plates 24 so as to define passageways 26 therebetween. Fixed a spaced distance beneath plates 24 are inclined baffles 27 which are substantially parallel to plates 24 so that downwardly sloping passages 28 are formed between 24 and 27. Baffles 27 are spaced apart at their upper ends so that a central passageway 29 is formed. Liquid plenum chambers 30 are beneath baffles 27 and passageways or orifices 31 penetrate 27 so as to connect chambers 30 with passageways 28. Beneath central passageway 29 and between baffles 27 is a hollow baffle 32 in the shape of an inverted pyramid, so that downwardly sloping passageways 53 are formed between baffles 27 and a stagnant layer of contact material which will remain on the horizontal upper surface of baffle 32. Flapper baffles 33 are pivoted on their upper ends from the lower ends of baffles 27. Baffles 33 extend across chamber 10 in the direction of the flaring of conduit 13 and are capable of being moved laterally to contact either plates 25 or baffles 32, on their lower ends. Baffles 33 are connected by members 34 to a crank 35 which in turn connects to a rotatable shaft 36. A suitable motor (not shown) is provided to turn shaft 36 continuously.

In operation, fresh, hot contact material at a temperature suitable for the desired conversion gravitates from supply zone 22 through conduit 23 into seal zone 12. Inert seal gas is admitted to zone 12 through conduit 37 at a rate sufficient to maintain a pressure therein slightly above the gaseous pressure in conversion zone 10. This rate is controlled by the operation of diaphragm valve 38 in response to differential pressure controller 39. Contact material passes outwardly in the flared lower end of 13. This flaring should be at an angle greater than the angle of repose of the contact material so that the contact material in the flared portion is not allowed to assume its normal surface. If a surface of contact material were formed it would result in undesirable segregation of the contact material according to particle size, the larger particles concentrating near the outer edges of zone 10, while the smaller particles concentrated near the center. In general, the angle of repose of the contact material will be within the range about 25–45 degrees. Contact material is discharged from the lower end of passage 13 onto downwardly gravitating, substantially compact column of contact material 40 within zone 10. The upper surface of column 40 is confined at an angle greater than the angle of repose of the contact material by members 24 and 25. Baffles 27 divide the upper section of column 40 into downwardly sloping streams of contact material flowing in passages 28 and a central stream of contact material flowing in passage 29. A high boiling liquid hydrocarbon charge is injected into the contact material streams flowing in passage 28 from plenum chambers 30 through passages 31. Plenum chamber 30 is supplied with liquid charge through conduit 41. The liquid charge is preferably introduced into the contact material as a low velocity stream so that very little of the charge will penetrate the contact material stream in 28 completely and contact the metal surface 24 to form coke thereon. Any coke which is formed is scrubbed from the metal surfaces defining passage 28 by the abrasive action of the contact material stream therein. Contact material and liquid charge are mixed as they flow down passage 28. Flapper baffles 33 are continuously moved back and forth in a reciprocating motion by the rotation of shaft 36 with a suitable prime mover (not shown). These baffles continuously create contact material surfaces within column 40, and alternately close off passages 28 through which contact material mixed with liquid charge is flowing and passages 53 through which contact material free of liquid charge is flowing. By this means liquid charge-bearing contact material and liquid charge-free contact material are alternately supplied to the contact material surfaces so that alternate layers of contact material mixed with liquid charge and contact material free of liquid charge are formed thereon. Liquid charge passes downwardly through the portion of column 40 below the surface created by baffles 33 and is converted to lower boiling gaseous products which are removed from the lower section of column 40, separately of contact material, through conduit 42. The gaseous products withdrawn through 42 may be disengaged from column 40 by any of a number of suitable arrangements, such as those shown in Simpson et al., U. S. Patent No. 2,336,041, or in Fahnestock, U. S. Patent No. 2,362,621. The used contact material is purged free of gaseous products by an inert purge gas such as steam or flue gas admitted through conduit 43. Used contact material is withdrawn from the lower section of the conversion zone by means of passage 14 and passed to lift tank 15. In the lift tank the contact material is mixed with a suitable lift gas, such as steam or flue gas, admitted through conduits 44 and 45 and transported up lift pipe 16 by the gas to separator 17. Lift gas is removed from 17 through pipe 46 and the contact material drops to a supply zone in the bottom of 17 from which it passes to reconditioner 11 through passage 18. In such processes as the catalytic cracking conversion of hydrocarbons, a substantial amount of carbonaceous contaminant is deposited upon the used contact material in which case the reconditioner takes the form of a catalytic regenerator. An oxygen-containing gas, such as air, is introduced centrally to downwardly gravitating, substantially compact column of contact material in zone 11 through conduit 47. This gas passes upwardly and downwardly through the column to burn off the contaminants on the contact material. Flue gas is removed through passages 48 and 49. Cooling tubes (not shown) are provided within vessel 11 to maintain the temperature therein below the temperature at which the contact material is permanently damaged. Cooling fluid is admitted to these tubes through passage 50 and withdrawn through passage 51. If the process is a strictly non-catalytic process, for example, in which the contaminant deposit on the contact material is negligible, or if it be a process wherein the amount of contaminant deposit is insufficient upon combustion to heat the contact material to the desired inlet temperature to the conversion zone, reconditioner 11 may take the form of an apparatus the principal function of which is to heat the contact material. Reconditioned contact material is removed from vessel 11 through passage 19 and passed to lift tank 20 from which it is transported to separator 22 through lift pipe 21 by lift gas admitted through passages 52 and 64. If desired, vaporized hydrocarbon charge may be converted simultaneously with the liquid charge. This vaporized charge may be admitted to plenum space 56 in the upper section of vessel 10 by conduit 57 and then passed into contact material column through passages 26. Alternatively, vapor may be admitted under the upper surface of column 40 by conduit 58 from which extend distributor channels 59. Vaporized charge may be admitted through both 57 and 58 at the same time if desired. The process of this invention does not require the addition of any vaporized charge, if it is more desirable to charge all the material to be converted as a liquid. Also, when vaporized charge is not admitted through 57, part or all of the gaseous products may be removed through 57, if this is desirable.

Figures 2 and 4 illustrate a modified form of this invention and will be considered together. There is shown therein a conversion vessel 10 with a transverse partition 60 extending across its upper section so as to form a supply chamber 61 in the upper end of vessel 10. A second transverse partition 62 extends across vessel 10 at a level below partition 60 so as to form a second supply chamber 63 between partitions 60 and 62 and a conversion chamber 64 therebelow in the lower section of vessel 10. Surge hopper 65 is positioned above vessel 10 and a conduit 66 extends downwardly from hopper 65 into supply zone 61. A second conduit 67 extends downwardly from hopper 65 into contact material cooler 68. Conduit 69 extends from cooler 68 into supply chamber 63. A plurality of uniformly spaced apart conduits 70 depend downwardly from partition 60 and terminate within the upper section of conversion chamber 64. A second plurality of uniformly spaced apart conduits 71 depend downwardly from partition 62 and terminate within the upper section of conversion chamber 64 at about the same level as conduits 70. Conduits 71 are so shaped so as to form a zig-zag path therein for contact material flow. Conduits 71 are spaced apart at their lower end by the same amount as conduits 70. A laterally movable horizontal closing plate 72 extends across the conversion chamber immediately below conduits 70 and 71. Plate 72 has orifices 73 therethrough with the same spacing as conduits 70 and 71 so that if plate 72 is moved back and forth orifices 73 will be aligned with either conduits 70 or 71 so as to close one set of conduits while opening the other. A shaft 74 is connected to one end of plate 72 and passes outwardly through the wall of vessel 10 and connects to a suitable mechanism for continuously moving plate 72 back and forth so as to alternately close conduits 70 and 71. The mechanism shown in Figure 2 is a single cylinder, double-acting, steam or gas engine 75. High pressure steam or gas is admitted through conduit 76 and passes into either end of 75 by controlling valves 77 on a time cycle. Gas is discharged through 78 by controlling valves 79 on a time cycle in conjunction with valves 77.

In one operation of this apparatus, granular contact material, at a temperature suitable for the desired conversion, gravitates as a confined stream from supply zone 65 through passage 66 onto a confined bed of contact material within supply chamber 61 in vessel 10. A second stream of contact material gravitates from supply zone 65 into cooler 68 through passage 67. In the cooler the contact material is cooled to a temperature below the temperature which will support the conversion, by indirect heat exchange with a cooling fluid circulated through cooling tubes (not shown) within 68. Cooling fluid is admitted through passage 80 and withdrawn through passage 81. A stream of cooled contact material gravitates from 68 through passage 69 onto a confined bed thereof in supply chamber 63. Fresh, hot contact material gravitates from the bed in chamber 61 downwardly as a plurality of streams through passages 70 into the upper section of conversion chamber 64. Cooled contact material passes as a second plurality of confined streams into the upper section of conversion zone 64 from the bed in chamber 63. High boiling liquid hydrocarbon charge is passed into vessel 10 through conduit 82 and distributed to a plurality of lateral pipes 83. The charge is injected into the upper section of the downwardly flowing contact material streams in passages 71 by means of nipples 85. Liquid charge passes downwardly through 71 and becomes mixed with the contact material therein. The zig-zag paths which contact material and liquid charge follow in passing through passages 71 aid in mixing the two. Plate 72 is alternately open to passages 70 and 71 from which contact material is discharged onto the upper surface of contact material column maintained therebelow in the lower section of conversion zone 64. By this means alternate layers of cooled contact material bearing liquid charge and hot contact material free of liquid charge are formed in the upper surface of column 40. The process then proceeds as described in connection with Figure 1. The surface level of column 40 may be maintained below plate 72 by any suitable level control device such as that shown in Simpson, U. S. Patent No. 2,574,503. The time cycle on which closing plate 72 operates should be adjusted so that enough contact material passes from passages 70 to maintain the contact material column at a temperature level which will maintain the desired conversion by transferring heat to the contact material which was discharged from passages 71. If desired, vaporized hydrocarbon feed may also be charged to the conversion zone, either at a level above contact material column 40 through conduit 86, or below the upper surface of column 40 through passage 87 with distributor troughs 88 thereon.

An alternate method of operating the apparatus of Figure 2 is to eliminate the cooling at 68. Then the liquid charge will be contacted with contact material above the conversion temperature and some conversion will usually take place in passages 71. The vapors formed thereby may pass out the lower ends of conduits 71 to be withdrawn with other gaseous products of the conversion. Vapors which pass upwardly into chamber 63 may be withdrawn through passage 89.

It should be noted that essentially this invention covers mixing the liquid charge with contact material, either above or below the conversion temperature, and supplying the mixture to a contact material surface alternately with a stream of fresh contact material at a temperature suitable for the conversion, so that alternate layers of liquid charge bearing contact and liquid charge-free contact material are formed on the surface. The contact material surface may be the upper surface of a columnar mass of contact material or a surface formed within a columnar mass of contact material. This method is to be distinguished from other methods in which liquid charge may be sprayed directly onto a contact material surface and then covered over with fresh contact material and methods wherein a liquid charge-contact material mixture is supplied to one contact material surface while fresh contact material is supplied to another surface horizontally and possibly vertically displaced therefrom. By mixing only a part of the contact material that it is necessary to supply to the contact material column with liquid charge, as is done in this invention, it is possible to pass the contact material downwardly through the passage in which the mixing occurs as a narrow high velocity stream which can be efficiently mixed with liquid charge and which will scrub the walls of the passage free of coke. Covering the mixture with a layer of fresh contact material provides a filtering effect which will tend to prevent any vapors formed on the contact material mixed with liquid charge from passing upwardly above the contact material column. In addition, by the method shown in Figure 2, it is possible to mix liquid charge with contact material at a temperature below the conversion and vaporization temperatures of the liquid charge so that no vapors will be formed, while still maintaining the contact material column at the conversion temperature by the additions of hot, fresh contact material.

Operating conditions in the process of this invention may vary widely, depending on the particular application. While the apparatus of Figure 1 illustrates a process in which about one-half of the total contact material is mixed with liquid charge, a greater amount of contact material may be contacted with the charge, if desired, by providing for smaller discharge openings from passages 53 so that a smaller amount of contact material will discharge from these passages when wide open then discharges from passages 28. The relative amounts of charge-bearing and charge-free contact material may be adjusted in the apparatus of Figure 2 by adjusting the time cycle of closing means 72.

Where the contact material and liquid hydrocarbon charge are mixed while the contact material is at the conversion temperature, as in the process of Figure 1 or Figure 2 when cooler 68 is not operated, the contact material will generally be introduced to the conversion zone at a temperature within the range about 900–1200° F.

and be removed therefrom at a temperature within the range about 750–950° F. The liquid hydrocarbon charge should be introduced at a temperature within the range about 100–800° F. and vaporized hydrocarbon charge, where used, at a temperature within the range about 700–950° F. The ratio of contact material to hydrocarbon charge by weight should generally be within the range about 2 to 20. The space velocity of the total charge should be within the range about 0.2 to 10 volumes of oil per hour per volume of reactor.

In a typical example of the process where liquid charge and contact material are mixed while the contact material is hot, a catalytic conversion system will be considered. The catalyst enters at a temperature of about 1075° F. and is removed when spent at a temperature of about 850° F. The liquid charge may be a deasphalted residual petroleum stock and is introduced at a temperature of about 500° F. Vaporized charge, which may be a petroleum gas oil, is introduced at a temperature of about 800° F. The catalyst to oil ratio is 5 to 1 by weight. The space velocity of the total charge is 2.0. The charge is 40 percent liquid and 60 percent vapor.

Where the contact material and liquid charge are mixed after cooling the contact material as in Figure 2 when cooler 68 is employed, the streams of fresh hot contact material should be introduced to the conversion zone at a temperature within the range about 950–1150° F. The cooled contact material should be at a temperature within the range about 700–900° F. before being mixed with liquid charge, and the contact material-liquid charge mixture should be at a temperature of within the range 600–800° F. after mixing. Contact material should be removed from the lower section of the conversion zone at a temperature within the range about 850–900° F. The liquid hydrocarbon charge should be supplied at a temperature within the range about 600–800° F. and vaporized hydrocarbon charge, if used, at a temperature of 750–950° F. The space velocity of the total charge should be within the range 0.2 to 10.0 volumes of oil per hour per volume of contact material bed.

In a typical example of the above process where the contact material acts as a catalyst, the hot contact material is introduced at a temperature of about 1075° F. The cooled contact material is chilled to a temperature of about 800° F. before mixing, and the liquid charge, which may be a deasphalted petroleum residuum, is introduced at a temperature of about 700° F. After mixing, the temperature of the mixture is about 745° F. Vaporized feed, which may be a petroleum gas oil, is introduced at a temperature of about 825° F. The space velocity of the total charge is 2.0. The charge is 40 percent vapor and 60 percent liquid.

This invention should be understood to cover all changes and modifications of the examples of the invention herein chosen for purposes of disclosure which do not constitute departures from the spirit and scope of the invention.

What is claimed is:

1. A continuous process for the conversion of high boiling liquid hydrocarbons to lower boiling hydrocarbons in the presence of a downwardly moving, substantially compact columnar mass of granular contact material which comprises: mixing granular contact material at a temperature suitable for the desired conversion with a high boiling liquid hydrocarbon charge, supplying said contact material mixed with liquid charge and fresh contact material free of liquid charge and at a temperature suitable for the desired conversion onto at least one contact material surface below which is a substantially compact columnar mass of granular contact material within a confined conversion zone as alternate layers of contact material containing liquid charge and fresh contact material free of liquid charge, said layers being applied one on top of the other to said surface so that along a vertical line within said mass there are alternate layers of contact material initially supplied mixed with liquid charge and contact material initially supplied free of liquid charge, passing the liquid charge through the columnar mass to effect the desired conversion to lower boiling hydrocarbon products, removing hydrocarbon products from the columnar mass and removing contact material from the lower section of the columnar mass.

2. A continuous process for the conversion of high boiling liquid hydrocarbon charge to lower boiling hydrocarbon products in the presence of a substantially compact column of granular contact material which comprises: maintaining the substantially compact column of contact material within a confined conversion zone, removing contact material from the lower section of said column to promote downward movement of the contact material particles through the column, supplying fresh contact material to the upper section of said column at a temperature suitable for the desired conversion, continuously forming contact material surfaces within said column by the mechanical reciprocation of solid members within said column, mixing a portion of the contact material above said surfaces with high boiling hydrocarbon charge, supplying the portion of the contact material mixed with liquid charge and the portion of contact material which is free of hydrocarbon charge to said surfaces alternately so that alternate layers of charge-bearing contact material and charge-free contact material are formed thereon, said layers being applied one on top of the other to said surfaces so that along a vertical line within said column below said surfaces there are alternate layers of contact material initially supplied mixed with liquid charge and contact material initially supplied free of liquid charge, passing the hydrocarbon charge through said column to effect the desired conversion to lower boiling products and removing said products from said column.

3. A continuous process for the conversion of high boiling liquid hydrocarbon charge to lower boiling hydrocarbon products in the presence of a downwardly gravitating, substantially compact column of granular contact material which comprises: maintaining said column of contact material within a confined conversion zone, mixing fresh contact material with the liquid hydrocarbon charge, alternately supplying contact material mixed with liquid charge and contact material free of liquid charge at a temperature suitable for the desired conversion to the upper surface of said column so as to form alternate layers of charge-bearing contact material and charge-free contact material on said surface of said column, said layers being applied one on top of the other to said surface so that along a vertical line within said column there are alternate layers of contact material initially supplied mixed with liquid charge and contact material initially supplied free of liquid charge, passing liquid charge downwardly through said column to effect the desired conversion to lower boiling products, removing said products from said column and removing contact material continuously from the lower section of said column.

4. A continuous process for the conversion of high boiling liquid hydrocarbon charge to lower boiling gaseous products in the presence of a downwardly gravitating, substantially compact column of granular contact material which comprises: maintaining said column within a confined conversion zone, laterally confining the upper surface of said column at an angle greater than the angle of repose of said contact material, supplying a substantially compact stream of fresh contact material at a temperature suitable to effect the desired conversion centrally onto the upper surface of said column, baffling the upper section of said contact material column so that contact material passes therethrough as a central compact stream and two outwardly and downwardly sloping compact streams around the central stream, baffling the flow of said central stream so as to form two outwardly and downwardly sloping compact streams within said first named two sloping streams, injecting liquid hydrocarbon charge into the outer sloping streams at a level above the lower end of said streams, moving solid members mechanically in a laterally reciprocating motion so as to form contact material surfaces in said column below said first named and second named sloping streams and alternately open and close the flow of contact material through said streams whereby alternate layers of charge-bearing and charge-free contact material are supplied to said surfaces, said layers being applied one on top of the other to said surfaces so that along a vertical line within said column below said surfaces there are alternate layers of contact material initially supplied mixed with liquid charge and contact material initially supplied free of liquid charge, passing liquid charge downwardly through said column to effect the desired conversion to lower boiling gaseous products, removing said products from the lower section of said column, removing contact material from the lower section of said column to promote downward movement of the contact material granules through said column, and controlling the rate of reciprocation of said solid members so that the volume of contact material flow past the solid members is slightly greater than the volume rate of displacement by the solid members as they move laterally.

5. A continuous process for the conversion of high boiling hydrocarbon charge to lower boiling gaseous products in the presence of a downwardly gravitating, substantially compact column of granular contact material, which comprises: maintaining said column within the lower section of a confined conversion zone with the upper surface of said column a substantial vertical distance below the upper end of said zone, passing a first plurality of confined substantially compact streams of contact material at a temperature suitable to support the desired conversion into the upper section of said conversion zone to a level substantially above the upper surface of said column, said streams being spaced uniformly across said zone, passing a second plurality of confined substantially compact streams of contact material at a temperature suitable to support the desired conversion into the upper section of said conversion zone to a level substantially above the supper surface of said column, said second plurality of streams being spaced uniformly across said zone among said first plurality of streams, injecting a high boiling liquid hydrocarbon charge into said second plurality of streams at a level substantially above the lower ends of said streams whereby the liquid charge will become mixed with the contact material in said streams, alternately discharging contact material from the lower ends of said first plurality of streams and said second plurality of streams whereby contact material alternately drops from said first plurality of streams and said second plurality of streams onto the upper surface of said column so as to form alternate layers of contact material mixed with liquid charge and contact material free of liquid charge on said column, said layers being applied one on top of the other to said surface so that along a vertical line within said column there are alternate layers of contact material initially supplied mixed with liquid charge and contact material initially supplied free of liquid charge, introducing a high boiling vaporized hydrocarbon charge into the upper section of said column at a level below the upper surface of said column, passing liquid hydrocarbon charge and vaporized hydrocarbon charge downwardly through said column to effect the desired conversion to lower boiling gaseous products, removing said gaseous products from the lower section of said column separately of the contact material, and removing contact material from the lower section of said column.

6. A continuous process for the conversion of high boiling liquid hydrocarbon charge to lower boiling gaseous hydrocarbon products in the presence of a downwardly gravitating, substantially compact column of granular contact material, which comprises: maintaining said column of contact material within the lower section of a confined conversion zone with the upper surface of said column at a level substantially below the upper end of said zone, maintaining an accumulation of contact material at a temperature above that necessary to effect the desired conversion within a confined supply zone at a level substantially above said conversion zone, gravitating a first stream of contact material from said supply zone to a first confined bed of contact material above said conversion zone, gravitating a second stream of contact material from said supply zone to a second confined bed of contact material above said conversion zone, said second bed being out of communication with said first bed, cooling said second stream of contact material to a temperature below the temperature which will support conversion before said stream is supplied to the second bed, gravitating a first plurality of streams of contact material from said first bed through a first plurality of uniformly spaced apart substantially vertical passages extending downwardly into said conversion zone and terminating at a level above the upper surface of said column, gravitating a second plurality of streams of contact material from said second bed through a second plurality of uniformly spaced apart passages interspersed among said first plurality of passages and extending into the upper section of said conversion zone and terminating at the same level above the upper surface of said column as said first plurality of passages, injecting a high boiling liquid hydrocarbon charge into the upper sections of said second plurality of passages, causing the contact material streams in said second passages to pass downwardly through said second passages in zig-zag paths whereby the contact material and liquid charge therein will be mixed, discharging contact material alternately from said first plurality of passages and said second plurality of passages onto the upper surface of said column by alternately opening the lower ends of said first and second pluralities of passages whereby alternate layers of cooled contact material mixed with liquid charge and hot contact material free of liquid charge are formed, said layers being applied one on top of the other to said surface so that along a vertical line within said column there are alternate layers of contact material initially supplied mixed with liquid charge and contact material initially supplied free of liquid charge, adjusting the time of opening and closing said first and second pluralities of passages so that enough hot contact material is discharged from said first plurality of passages to maintain the temperature of said column at a level suitable to effect the desired conversion, passing the liquid charge downwardly through said column to effect the desired conversion to lower boiling gaseous products, removing said products from the lower section of said column and removing contact material from the lower section of said column.

7. An apparatus for the conversion of high boiling liquid hydrocarbons to lower boiling gaseous products in the presence of a substantially compact, downwardly moving column of granular contact material, which comprises in combination: an enclosed conversion chamber adapted to confine said column of contact material, members defining at least two separate passageways for contact material within said conversion chamber adapted to supply contact material to at least one contact material surface in said chamber, means for supplying contact material to said passageways, means for injecting liquid hydrocarbon charge into one of said passageways, at least one moveable closing member adapted to open and close flow through said passageways, mechanism for operating said closing member so as to alternately close said two passageways, means for removing gaseous products from the conversion chamber and means for removing contact material from the lower section of said chamber.

8. An apparatus for the conversion of high boiling hydrocarbon charge to lower boiling gaseous hydrocarbon products in the presence of a downwardly gravitating, substantially compact column of granular contact material, which comprises in combination: an enclosed conversion chamber adapted to confine said column of contact material therein, a conduit for the supply of contact material to said column extending into the upper section of said chamber, members dividing the upper section of said chamber into at least two passageways for contact material adapted to receive contact material from said supply conduit, a plurality of laterally moveable baffles at a level beneath said passageways, mechanism for moving said baffles back and forth so as to alternately close said two passageways from communication with the portion of said chamber therebelow, means for injecting high boiling liquid hydrocarbon charge into one of said passageways, means for supplying vaporized hydrocarbon charge to said chamber at a level below said baffles, means for removing gaseous products of conversion from the lower section of said chamber and means for removing granular contact material from the lower section of said chamber.

9. An apparatus for the conversion of high boiling hydrocarbons to lower boiling hydrocarbons in the presence of a downwardly gravitating, substantially compact column of granular contact material which comprises, in combination: an enclosed conversion vessel adapted to confine said column of contact material in its lower section, a first transverse partition extending across the upper section of said vessel at a level below said first partition so as to provide a second contact material supply chamber thereabove and a conversion chamber therebelow, a supply hopper for contact material above said vessel, a first conduit for contact material extending from said hopper into said first supply chamber within said vessel, a second conduit for contact material extending from said hopper into a contact material cooling vessel, means for circulating cooling fluid in indirect heat exchange relationship with the contact material in said vessel, a conduit for the removal of cooled contact material from said cooler extending into said vessel through said first supply chamber and into said second supply chamber therein, a plurality of uniformly spaced apart conduits depending downwardly from said first partition and terminating at a common level in the upper section of said conversion chamber, a plurality of uniformly spaced apart conduits depending downwardly from said second partition to about the same level as said first-named plurality of conduits, said last-named plurality of conduits being interspersed among said first-named plurality of conduits, a laterally movable closing plate extending across said conversion chamber immediately beneath both of said pluralities of conduits and having a plurality of openings therethrough capable of being aligned alternately with said first named plurality of conduits or said last-named plurality of conduits, means for moving said closing plate continuously back and forth so as to alternatively close off said first-named plurality of conduits and said second-named plurality of conduits, means for injecting a high boiling liquid hydrocarbon charge into the upper sections of said last-named plurality of conduits, means for supplying vaporized hydrocarbon charge to the upper section of said conversion chamber, means for removing gaseous products from the lower section of said conversion chamber, means for removing contact material from the lower section of said conversion chamber and means for supplying contact material at a temperature suitable to support the desired conversion to said supply hopper.

References Cited in the file of this patent

UNITED STATES PATENTS

| | | |
|---|---|---|
| 2,492,998 | Lassiat | June 3, 1950 |
| 2,513,294 | Eastwood et al. | July 4, 1950 |
| 2,548,286 | Bergstrom | Apr. 10, 1951 |
| 2,565,811 | Hall | Aug. 28, 1951 |
| 2,606,861 | Eastwood | Aug. 12, 1952 |
| 2,687,372 | Ray | Aug. 24, 1954 |